United States Patent [19]

Sahara et al.

[11] Patent Number: 4,729,144
[45] Date of Patent: Mar. 8, 1988

[54] RETRACTABLE TYPE WIPER APPARATUS

[75] Inventors: Hideshi Sahara, Toyohashi; Takayuki Imamura, Hamamatsu, both of Japan

[73] Assignees: Asmo Co. Ltd., Shizuoka; Mazda Motor Corporation, Hiroshima, both of Japan

[21] Appl. No.: 921,154

[22] Filed: Oct. 21, 1986

[30] Foreign Application Priority Data

Jun. 18, 1986 [JP] Japan .................. 61-141868

[51] Int. Cl.$^4$ ............................ B60S 1/22; B60S 1/24
[52] U.S. Cl. ....................... 15/250.16; 74/70; 74/75; 74/600
[58] Field of Search ........... 15/250.16, 250.17, 250.34; 74/600, 601, 70, 75

[56] References Cited

U.S. PATENT DOCUMENTS

| | | | |
|---|---|---|---|
| 3,800,624 | 4/1974 | Klement et al. | 74/600 |
| 3,942,385 | 3/1976 | Westerdale | 15/250.17 X |
| 4,400,844 | 8/1983 | Hayakawa et al. | 74/70 X |
| 4,454,626 | 6/1984 | Schmidt et al. | 15/250.16 |
| 4,559,845 | 12/1985 | Fallows | 15/250.16 X |

FOREIGN PATENT DOCUMENTS 59-190648  4/1985  Japan .

*Primary Examiner*—Peter Feldman
*Attorney, Agent, or Firm*—Birch, Stewart, Kolasch, & Birch

[57] ABSTRACT

A retractable type wiper apparatus including a first crank connected to an output shaft of a reducer of a wiper motor and a second crank rotatably secured to the first crank by use of a first pivot shaft and so arranged that the second crank is maintained in a bent orientation at a predetermined angle relative to the first crank during the rotation of the first crank in the forward direction. The second crank is extended substantially straight relative to the first crank during the rotation of the first crank in the reverse directions. A stop member is provided on the first crank for defining a first locking recess and a second locking recess. A detent is longitudinally slidably mounted on the second crank. A spring means urges the detent selectively into the first and second locking recesses to thereby lock the second crank in place when the second crank is positioned at the predetermined angled position and at the straight extended position, respectively, relative to the first crank. The link member is rotatably connected to the second crank by a second pivot shaft for transmitting the motion of the second crank to a wiper blade. A cam member is rotatably mounted over the second pivot shaft and adapted to press and lock the detent as it is urged into either the first or second recess.

6 Claims, 37 Drawing Figures

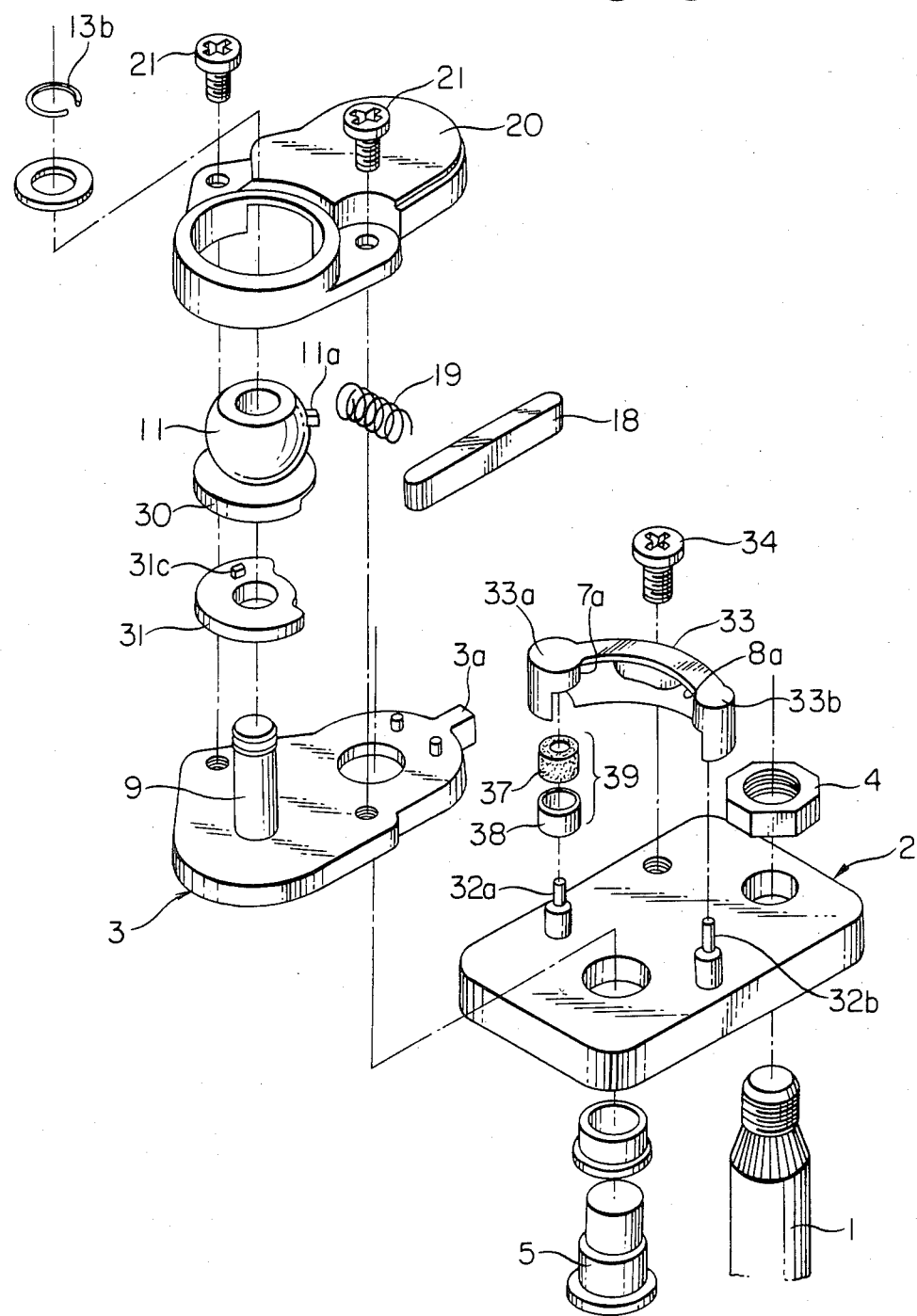

RETRACTABLE TYPE WIPER APPARATUS

TECHNICAL FIELD

This invention relates to a wiper apparatus for wiping a windshield of an automobile, and more particularly to improvements on a retractable type wiper apparatus, the wiper blade of which is adapted to be retracted or concealed from view when not in use.

BACKGROUND ART

Japanese Utility Model Application Public Disclosure (Kohkai publication) No. 59-190648 discloses a typical retractable wiper apparatus of the type described, as shown in FIGS. 19 to 21 attached to the present application.

More specifically, the prior art wiper apparatus illustrated therein comprises a first crank 2 connected to and locked by a nut 4 to an output shaft 1 of a reducer which is in turn connected to a wiper motor (not shown), and a second crank 3 which is secured to the first crank by means of a first threaded pivot shaft 5 projecting from the second crank and a nut 6. The first crank 2 is formed with stop shoulders 7 and 8 having locking recesses 7a and 8a, respectively. Secured to the second crank 3 is a second pivot shaft 9 over which a cam 10 is fitted. A bearing 11 is also fitted over the pivot shaft 9 and secured integrally to the cam 10. A first link 12 is secured to the bearing 11 by means of a socket 13 which is connected to the link 12 and adapted to receive the bearing 11.

A wiper blade 14 is supported by a wiper arm 15 which is secured at a pivot 16 to a second link 17 which is in turn connected to the first link 12. A detent 18 engageable with locking recesses 7a, 8a is slidably mounted in a guide frame 20 and is biased outwardly by a spring 19. The frame 20 is fastened to the second crank 3 by screws 21.

During the normal wiping operation the motor output shaft 1 is rotated in the forward direction of rotation as indicated by the arrow P in FIG. 21. The rotation of the first crank 2 in this direction initially causes the second crank 3 connected by links 12 and 17 to the wiper arm 15 to be relatively rotated about the pivot shaft 5 due to the rotational resistance of the second crank 3 until the second crank is bent relative to the first crank and comes into abutment with the stop shoulder 8 of the first crank 2, whereupon the detent 18 is urged into the recess 7a to lock the second crank to the first crank at said bent angle. While angled relative to the first crank 2 as shown in FIG. 21, the second crank 3 is thus rotated about the output shaft 1 in the direction P, whereby the pivot pin 16 is moved in its reciprocal rotating motion by means of the links 12, 17 to operate the wiper blade 14 for wiping action.

The range in which the wiper blade 14 is reciprocally moved with the second crank 3 angled relative to the first crank 2 is a normal range of operation. Upon the wiper motor being deenergized, the wiper blade is stopped at the extreme end A of the normal range of operation by a conventional automatic stopping-at-fixed position mechanism (not shown).

When it is desired to stow away or retract the wiper arm 15 from its normal stop position A, the wiper motor is driven in the reverse direction, so that the first crank 2 is rotated in a direction opposite from that indicated by the arrow P. The second crank 3 which is connected to the wiper blade 14 by means of the links 12, 17 is caused to relatively rotate about the pivot shaft 5 due to the rotational resistance until the crank 3 comes into abutment with the stop shoulder 7 of the first crank 2 to assume the straight extended position whereupon the detent 18 is urged into the recess 8a to lock the second crank at its extended position.

The effective length of the cranks when the second crank 3 is extended straight relative to the first crank 2, that is, the distance between the two shafts 1 and 9 is longer than the distance between the two shafts 1 and 9 when the second crank is at its angled position, so that the wiper blade 14 at its normal stop position A in FIG. 21 is retracted beyond its normal range of operation into the retracted or concealed position B.

During the wiping and blade retracting operations the cam 10 fitted over the pivot shaft 9 of the second crank 3 is rotated in unison with the link 12. The cam 10 is adapted to press and lock the detent 18 which is in engagement with the recess 7a during the forward rotation for the wiping operation and to disengage from the detent upon reverse rotation through some degrees of angle (about 35°) of the cam 10 after the normal rotation (180°), and then to press and lock the detent 18 as it is engaged with the recess 8a when the second crank 3 is completely extended relative to the first crank.

While the prior art retractable wiper apparatus described above is capable of retracting the wiper blade from the normal stop position A into the retracted position B by means of the relatively simple mechanism, during the normal continuous driving of the motor (wiper operation) with the second crank 3 bent at the predetermined angle relative to the first crank 2 such condition occurs once per rotation of the cam that the cam 10 is disengaged from pressing contact with the detent 18. In such condition there is instability in operation in that the biasing force of the spring 19 alone is relied on for urging the detent 18 into the recess 7a of the stop shoulder 7. As a result, play or creaking tends to occur, causing clattering at the tip of the wiper blade and making the automobile driver feel uneasy.

DISCLOSURE OF INVENTION

Accordingly, it is an object of this invention to provide an improved retractable wiper apparatus in which the cam means for pressing and locking the detent in place comprises two cam members cooperating to always maintain the detent in its pressed and locked position during the rotation of the output shaft of the reducer in the forward direction (wiping operation) whatever angular position the cams may be at whereby there may be no play or creaking during the wiping operation and in which smooth motion of the wiper blade is insured even under external forces such as strong wind as during the high speed driving of the automobile and in which harsh impact noises are eliminated which occurred with the prior art wiper apparatus due to vibrations transmitted from the wiper blade and other parts during the normal operation of the wiper apparatus.

According to this invention, the foregoing objects are accomplished by providing a retractable type wiper apparatus comprising a first crank connected to an output shaft of a reducer of a wiper motor; a second crank rotatably secured to the first crank by means of a first pivot shaft and so arranged that the second crank is kept bent at a predetermined angle relative to the first crank during the rotation of the first crank in the forward direction, and kept extended substantially straight relative to the first crank during the rotation of the first crank in the reverse direction; stop means provided on the first crank for defining a first locking recess and second locking recess; a detent slidably mounted on the second crank; a spring urging said detent selectively into said first and second locking recesses to thereby lock the second crank in place when the second crank is positioned at the predetermined angled and at the straight extended position, respectively relative to the first crank; means for allowing the detent to be tilted in the direction of forward rotation of the second crank about an end of said detent adjacent said stop means; link means rotatably connected to the second crank by means of a second pivot shaft for transmitting the motion of the second crank to a wiper blade; cam means rotatably mounted over the second pivot shaft and adapted to press and lock said detent as it is urged into either said first or second recess, said cam means comprising two superposed cam members both engageable with said detent, one of the cam members being connected integrally with said link means and the other of the cam members being adapted to be moved together with the one cam member with a limited range of lost motion so that the two cam members are maintained at such angles relative to each other that they cooperate to press and lock said detent during the rotation of said first crank in the forward direction.

Preferably, shock absorbing means is provided to buffer vibrations transmitted from the wiper blade to the second crank during the rotation of the first crank in the forward direction.

BRIEF DESCRIPTION OF THE DRAWINGS

The features and advantages of the present invention will be more fully disclosed in the following specification with reference to the accompanying drawings, in which:

FIG. 3 is an exploded perspective view of the wiper apparatus shown in FIG. 1;

FIGS. 6A-11A and 6B-11 are diagrammatic views illustrating the successive steps of the wiping operation by the wiper apparatus;

FIGS. 12A-16A and 12B-16B are diagrammatic views illustrating the successive steps of the retracting operation of the wiper apparatus;

DETAILED DESCRIPTION OF THE PREFERRED EMBODIMENT

Figure 1:
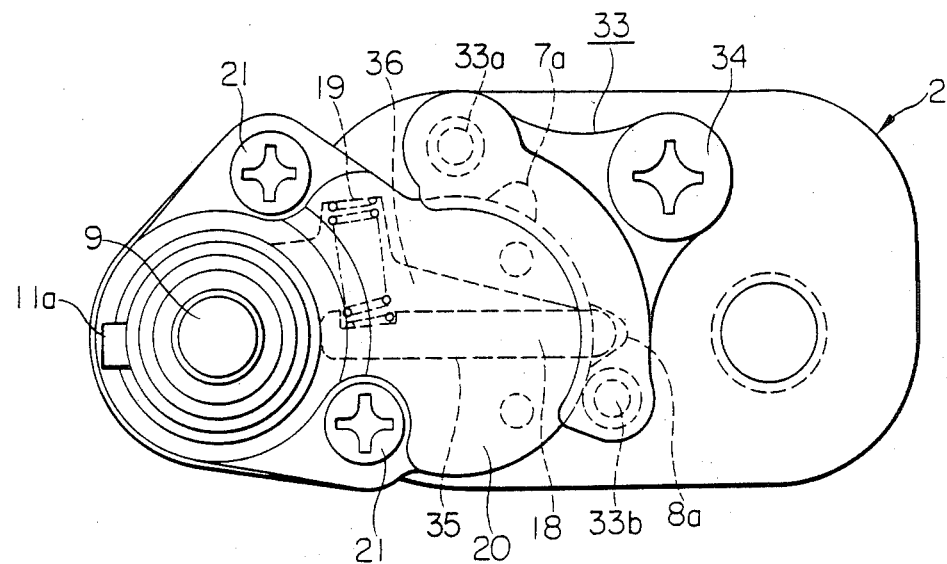
FIG. 1 is a top plan view of the principal part of the retractable type wiper apparatus according to one embodiment of the present invention.
Figure 2:
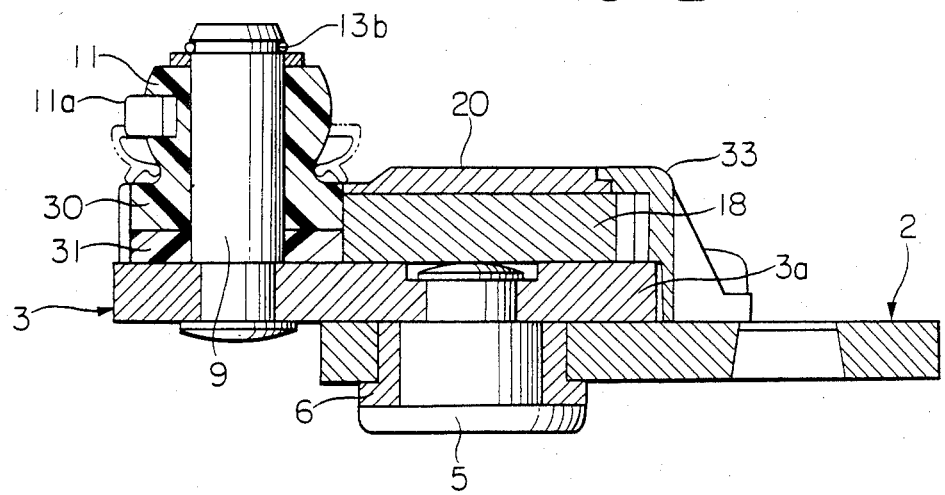
FIG. 2 is a longitudinal cross-sectional view of the wiper apparatus shown in FIG. 1.
Figures 4A, 4B, 4C:
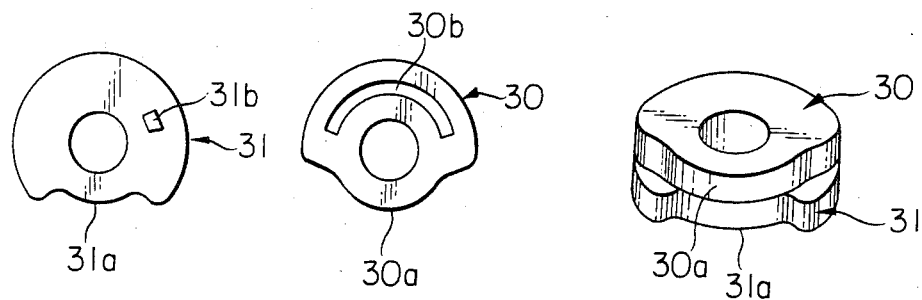
FIG. 4A is a perspective view of the cam means according to the present invention illustrating the two cam members at the same angular position.
FIGS. 4B and 4C are plan views of the first and second cam members of the cam means shown in FIG. 4A, respectively.
Figures 5A, 5B, 5C:
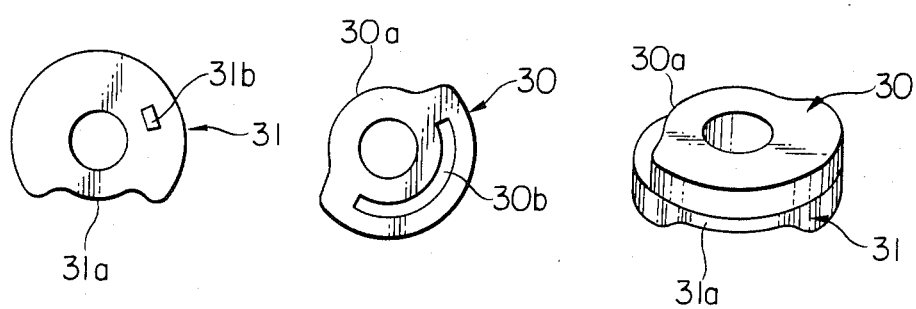
FIG. 5A is a view of the cam means similar to FIG. 4A but illustrating the cam members at different angular positions.
FIGS. 5B and 5C are plan views of the first and second cam members of the cam means shown in FIG. 5A, respectively.
Figure 19:
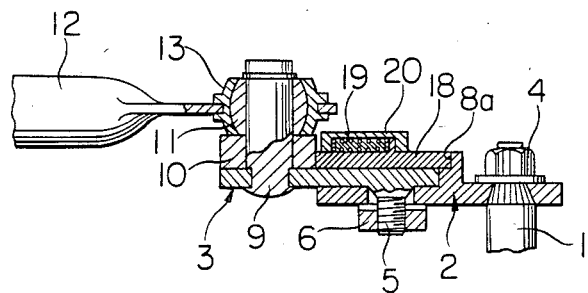
FIG. 19 is a longitudinal cross-sectional view of a prior art retractable type wiper apparatus.
Figure 20:
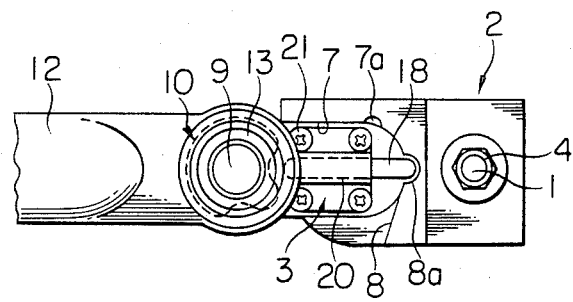
FIG. 20 is a plan view of the wiper apparatus shown in FIG. 12.
Figure 21:
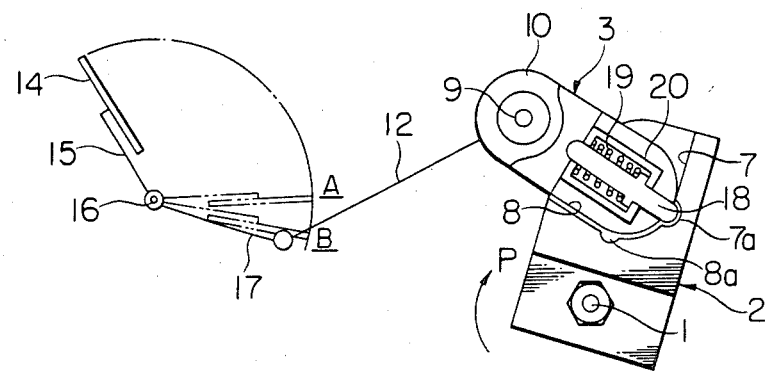
FIG. 21 is a diagrammatic view illustrating the wiper apparatus in operation.

An embodiment of the present invention will now be described with reference to FIGS. 1 to 3 in which components of the wiper apparatus of this invention which are similar to corresponding components of the prior art wiper apparatus described hereinabove and shown in FIGS. 19-21 are designated by the same reference numerals as in the prior art apparatus.

The wiper apparatus according to this invention basically comprises a first crank 2 connected to and locked by a nut 4 to an output shaft 1 of a reducer (not shown) which is in turn connected to a wiper motor (not shown), and a second crank 3 which is secured to the first crank 2 by means of a first pivot shaft 5 projecting from the second crank 3 and a sleeve 6.

Fastened to the first crank 2 by a screw 34 is a generally arcuate stop member 33 having spaced apart locking recesses 7a and 8a. Secured to the second crank 3 is a second pivot shaft 9 over which cam means comprising two stacked cam members 30, 31 is rotatably mounted. A bearing 11 is integrally connected with the upper cam member 30 of the cam meeans and is also fitted over the pivot shaft 9. A first link 12(see FIG. 19)is securely connected to the bearing 11 by means of a socket 13 (see FIG. 19) adapted to receive the bearing and having a slot (not shown) for receiving a connecting pin 11a projecting from the bearing 11 to prevent relative rotational movement between the socket and bearing. A snap ring 13b is mounted on the shaft 9 to retain the bearing 11 in place.

A guide frame 20 having a guide channel 35 for guiding the longitudinal movement of a detent 18 is fastened to the second crank 3 by screws 21, said guide frame having an arcuate convex surface in complementarily fitting relation to the arcuate concave surface of the arcuate stop member 33 so that the detent 18 may be in sliding contact with the arcuate surface of the stop member 33 extending between the locking recesses 7a and 8a and be selectively received in the recesses 7a and 8a when the detent is extended.

The arcuate stop member 33 is formed with generally cylindrical enlarged portions 33a and 33b at its opposite ends, said enlarged portions having downwardly opening cavities 33a, 33b receiving stop pins 32a and 32b, respectively upstanding from the first crank 2. An extension 3a projecting from the second crank 3 at its inner end is adapted to abut against stop pins 32a and 32b when the detent 18 is plunged into the recesses 7a and 8a, to thereby define the angular relation of the second crank 3 to the first crank 2. That pin 32a of the two stop pins which is engaged by the extension as the wiper blade 14 is shifted to its normal oscillatory movements is provided with shock absorbing means 39 comprising a ring 37 of resilient material such as rubber or the like fitted over the pin 32a and a sleeve 38 formed of metal or synthetic resin surrounding said ring. One of the opposed walls of the guide channel 35 in the guide frame 20 flares or extends angularly from the inner end of the channel adjacent the stop member 33 toward the direction of forward rotation of the second crank 3 so as to define a sector-shaped relieved area 36 for accommodating the tilting of the detent 18 about a point at the arcuate stop member 33. A biasing spring 19 is disposed between the detent 18 and the angular wall of the guide channel 35 and extends at an angle transversely to the detent so as to exert components of force on the detent to urge the latter inwardly toward the stop member 33 as well as against the opposite wall of the channel 35.

Referring to FIGS. 4A-4C and 5A-5C, the cam members 30 and 31 are formed around their peripheries with notches 30a and 31a, respectively extending through different angles of arc. The bearing 11 is removed from these drawings to illustrate the configurations of the cam members. The upper cam member 30 connected integrally with bearing 11 is further formed with a concentric arcuate slot 30b extending through a lost-motion angle of about 180°. The lower cam member 31 has a projection 31b extending therefrom and adapted to be inserted into the arcuate slot 30b.

The wiping operation of the wiper apparatus constructed as described above will be described with reference to FIGS. 6A-11A and 6B-11B.

Figure 6A:
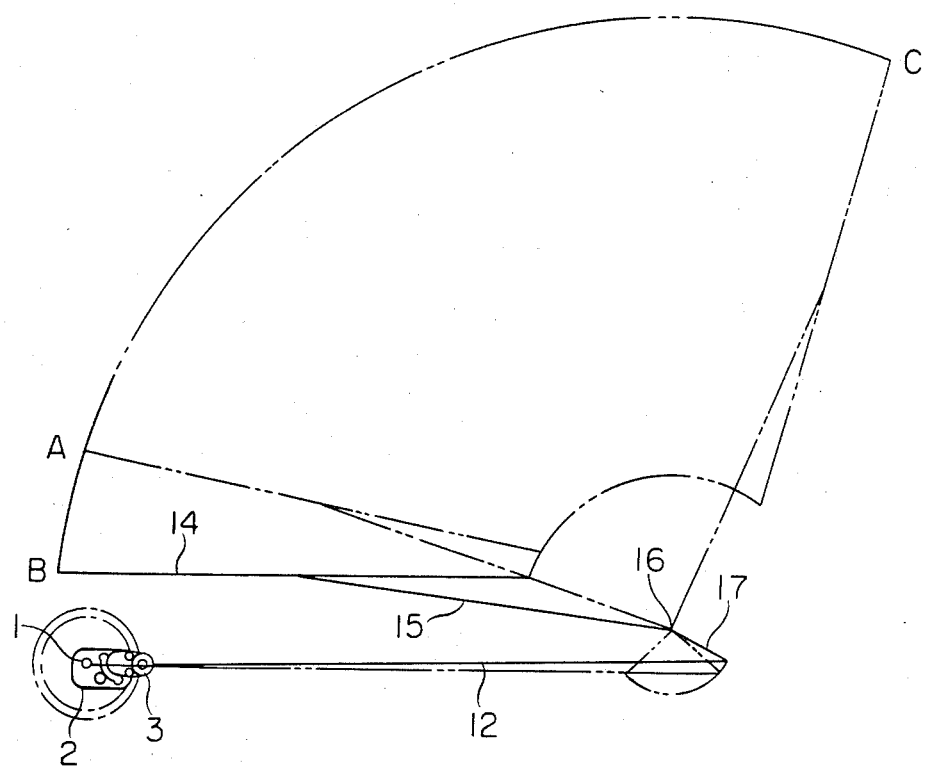
Figure 6B:
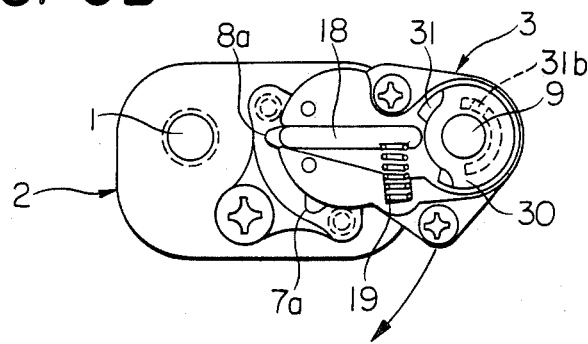
Figure 7A:
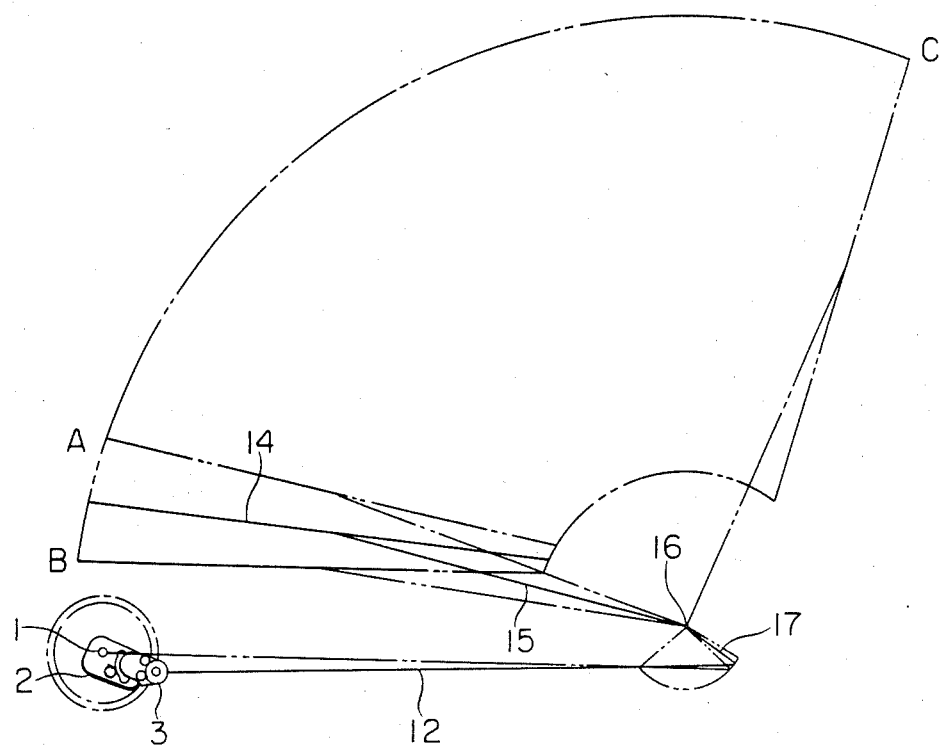
Figure 7B:
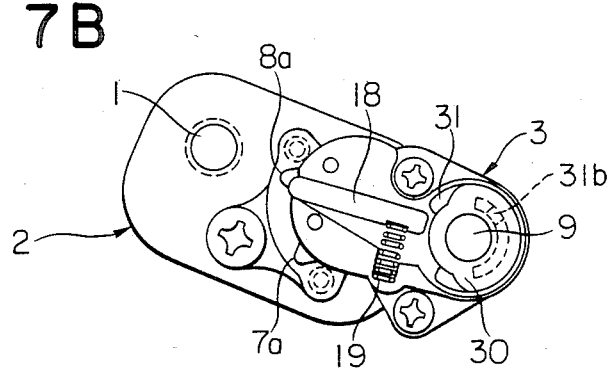
Figure 8A:
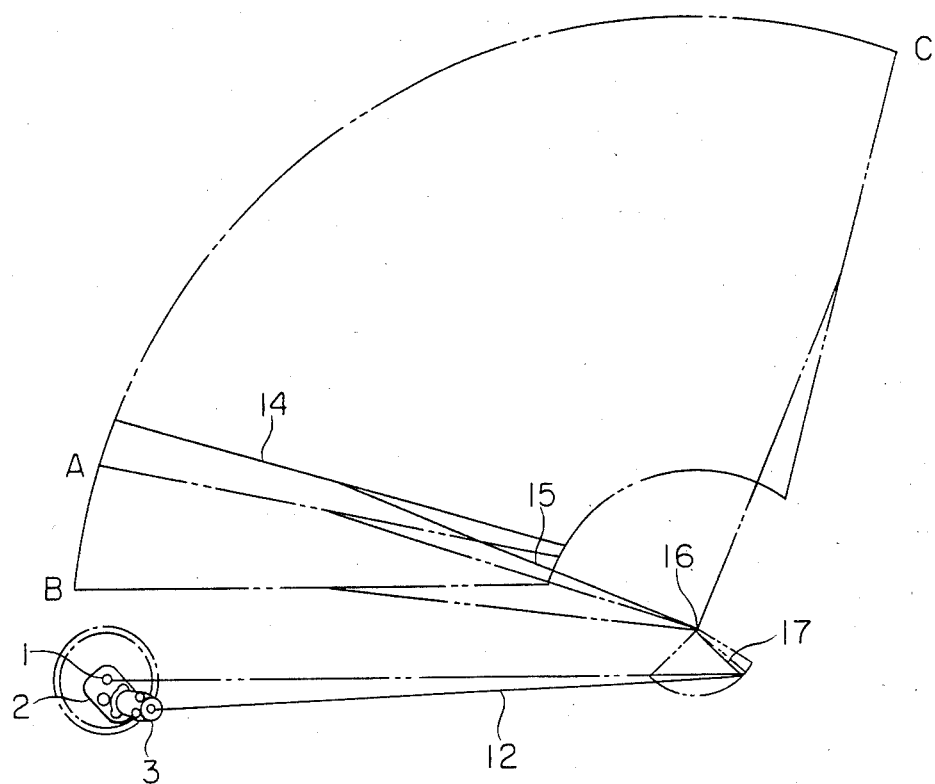
Figure 8B:
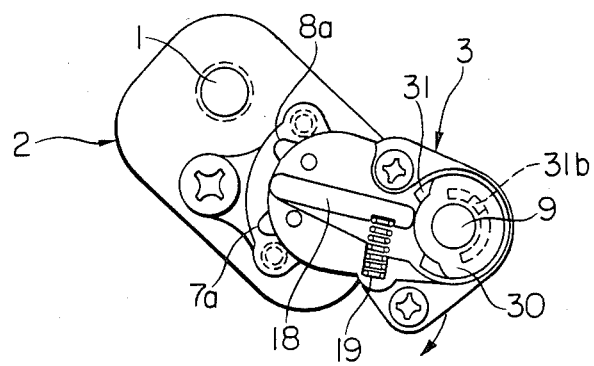
Figure 9A:
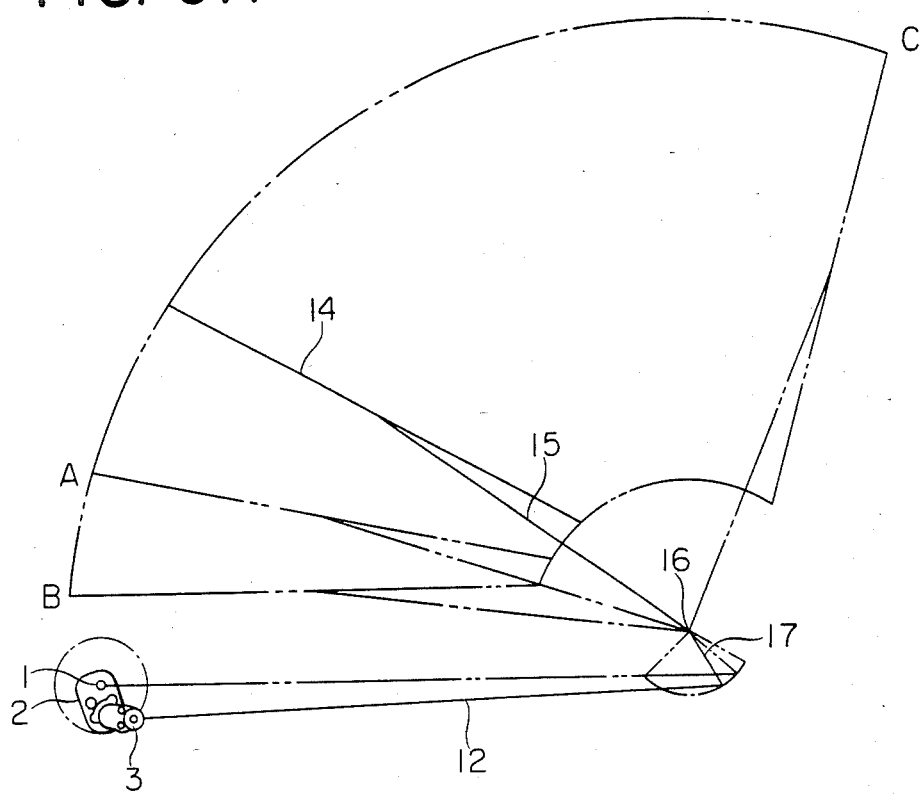
Figure 9B:
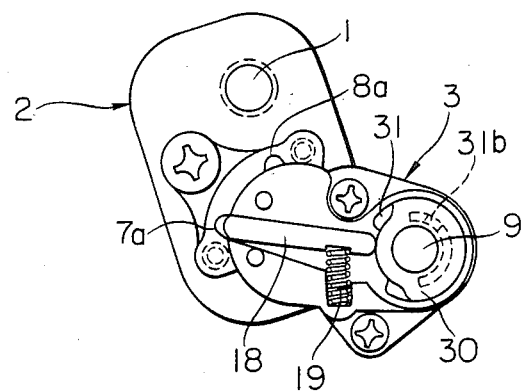
Figure 10A:
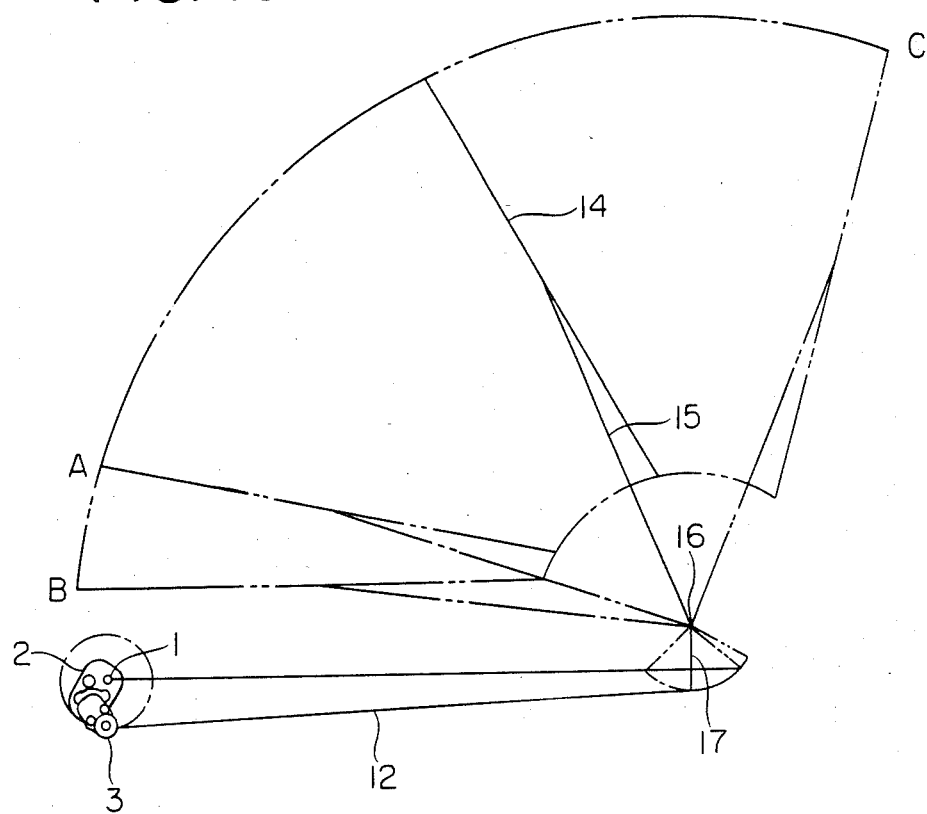
Figure 10B:
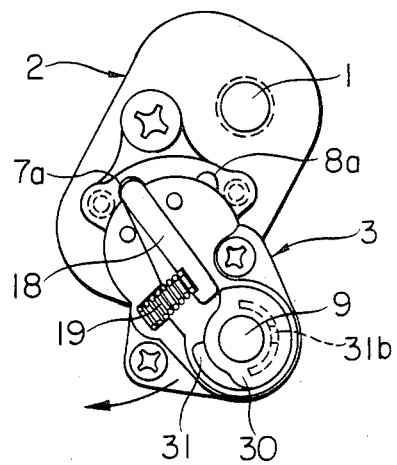

FIGS. 6A and 6B illustrate the wiper blade 14 stopped at the retracted position B wherein the second crank 3 is extended straight in axial alignment with the first crank 2. The notches 30a and 31a of the cam members 30 and 31, respectively are in phase, namely in alignment with each other, and the aligned notches 30a, 31a are in an angular position opposing the detent 18, so that the detent, released from the locking action by the cam members 30, 31, is urged into the locking recess 8a by the biasing force of the spring 19 alone.

FIGS. 7A and 7B to FIGS. 10A and 10B illustrate the first crank 2 rotated by the driving of the wiper motor in the forward direction, whereby the detent 18 is dislodged from the recess 8a and urged into the recess 7a with the second crank 3 bent at the corresponding angle relative to the first crank 2.

Figure 11A:
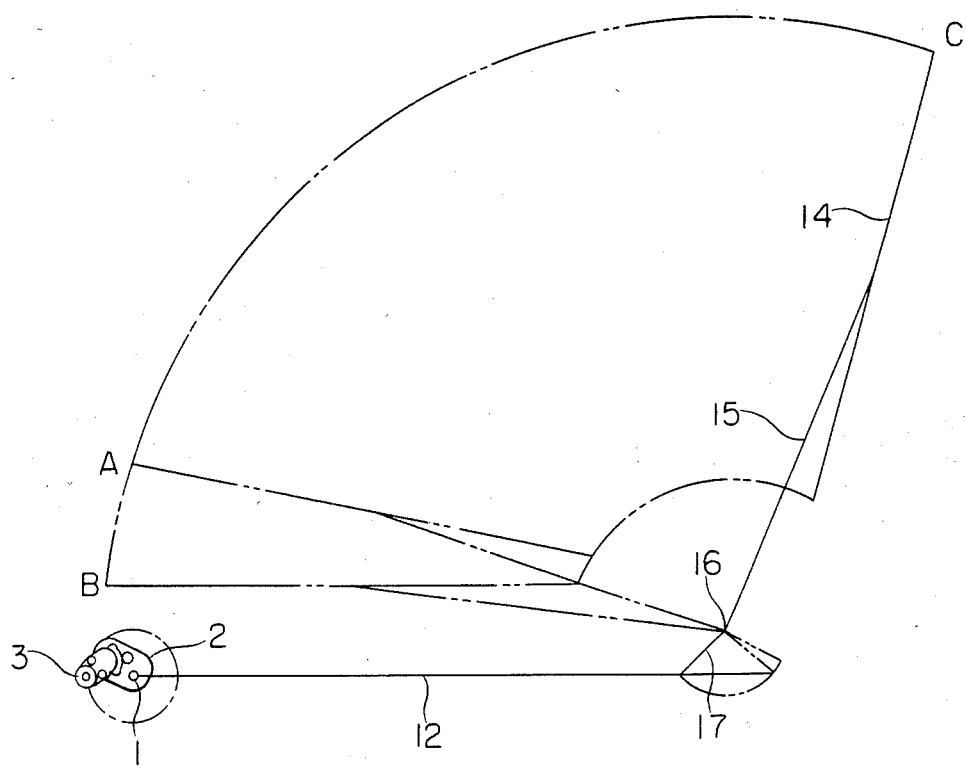
Figure 11B:
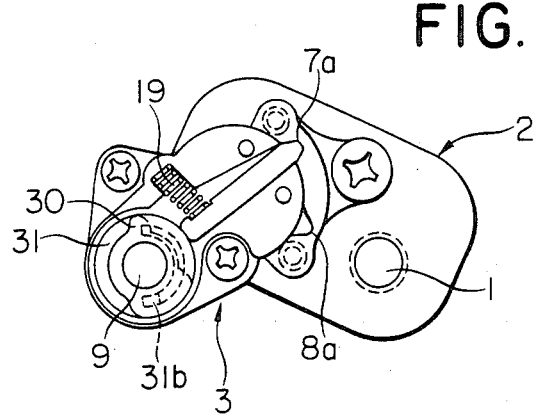

Figs. 11A and 11B illustrate the first crank 2 further rotated, whereby the cam member 30 is rotated through a corresponding angle while the projection 31b of the second cam 31 relatively moves along the arcuate slot 30b from one end to the other end thereof where there is a displacement in phase between the notches 30a and 30b of the cam members 30 and 31, whereby the two cam members cooperate to define a complete circular cam surface to lock the detent 18 in place.

Thereafter, the cam members 30 and 31 will be rotated in unison while maintaining the detent 18 locked. The forward rotation of the output shaft 1 continues until the wiper blade 14 arrives at one extreme end C of the wiping movement, from where the wiper blade is reversed in its direction of movement. The rotation of the wiper blade in the reverse direction continues until the blade reaches the other extreme end A of the wiping movement which is the point of reversal for the normal wiping operation.

Next, the operation for stowing the wiper blade to the retracted position will be described with reference to FIGS. 12A, 12B to 16A, 16B.

When it is desired to retract the wiper blade to the recessed position B, a switch (not shown) disposed in an electric power supply circuit (not shown) is thrown into an "off" position, said circuit having an automatic stopping-at-fixed position mechanism and a reversing mechanism for the wiper motor. Upon the switch being moved into the off position, the wiper motor is continued to be rotated in the forward direction under the control of the circuit until the wiper blade 14 is moved from the position A back to the position C whereupon the motor is reversed.

Figure 12A:
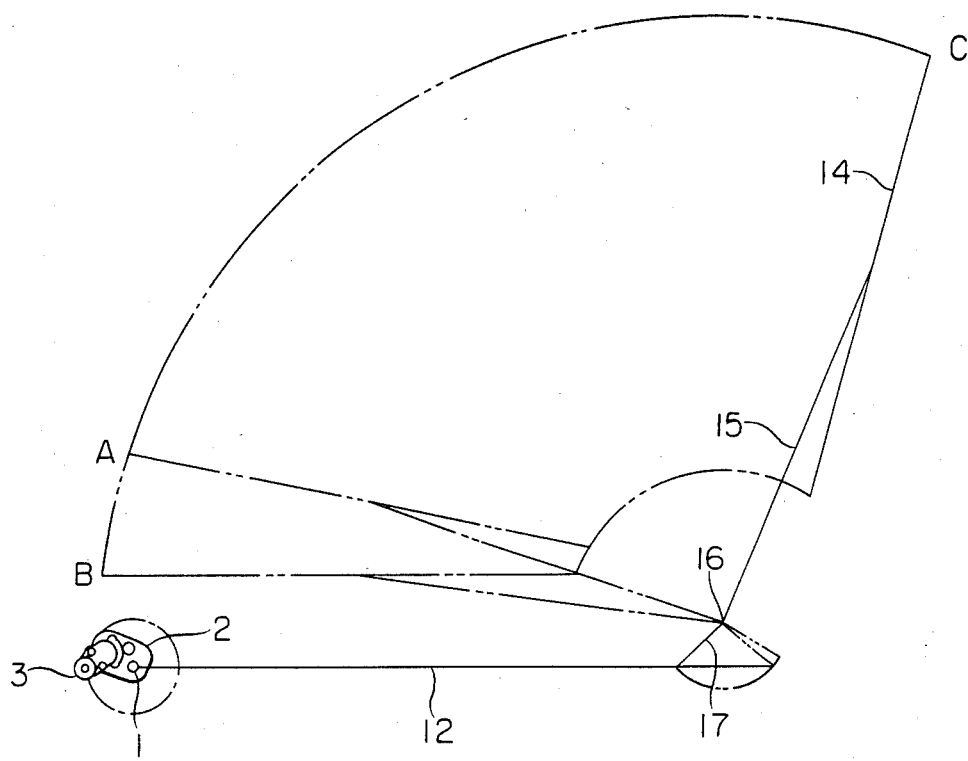
Figure 12B:
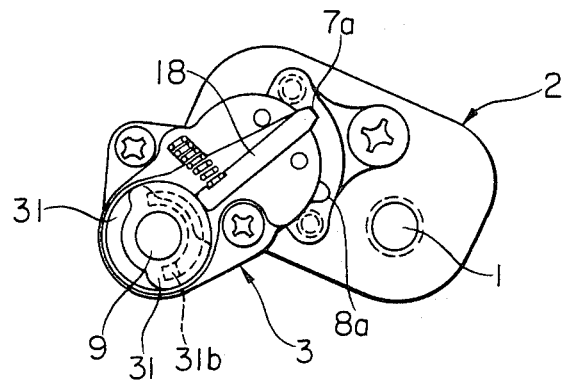

FIGS. 12A and 12B illustrate the wiper blade 14 moved back to the point of reversal C where the wiper motor is reversed to rotate the output shaft 1 in the reverse direction.

FIGS. 12A and 12B illustrate the wiper blade 14 moved back to the reversal position C when the wiper motor is reversed as is the output shaft 1.

Preferring to FIGS. 13A, 13B-15A, 15B, the first crank is then rotated by the reverse rotation of the output shaft 1. During this operation the notches 30a and 31a of the cam members 30 and 31, respectively are in phase, namely in alignment with each other, and the aligned notches 30a and 30b are in an position opposing the detent 18, so that the detent is released from the locking action by the cam members.

Figure 13A:
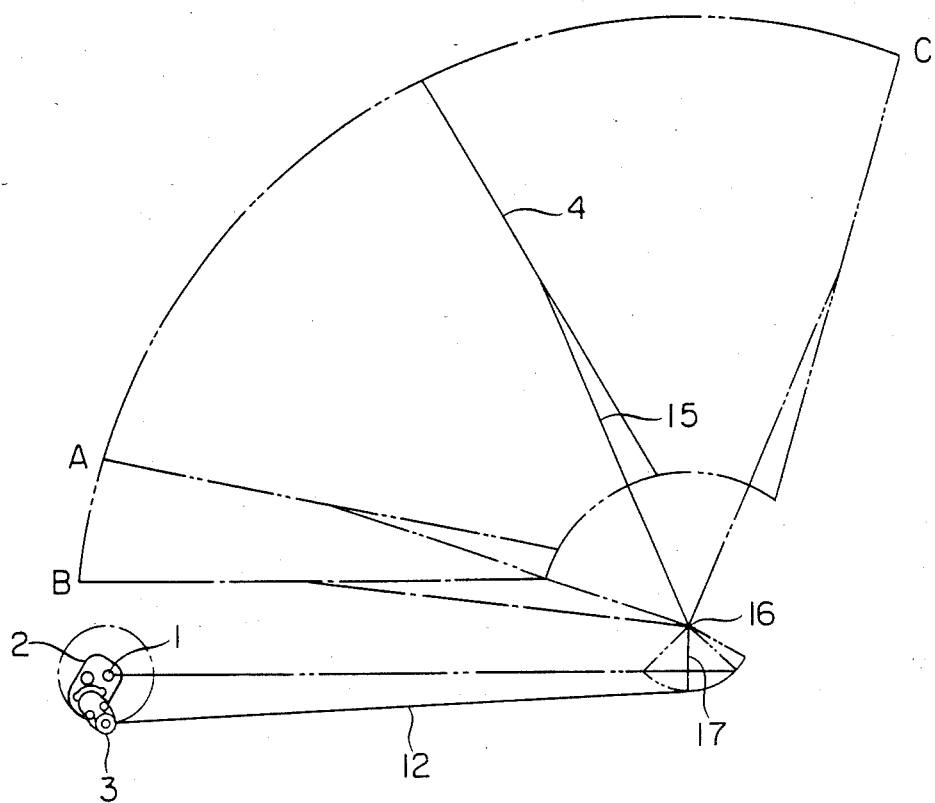
Figure 13B:
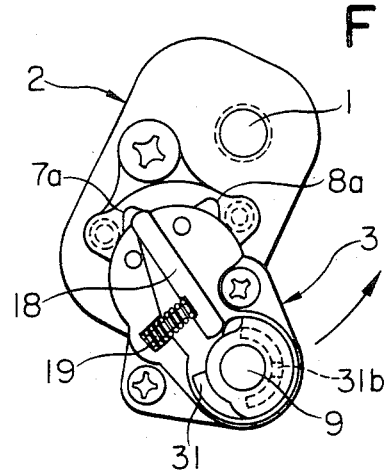
Figure 14A:
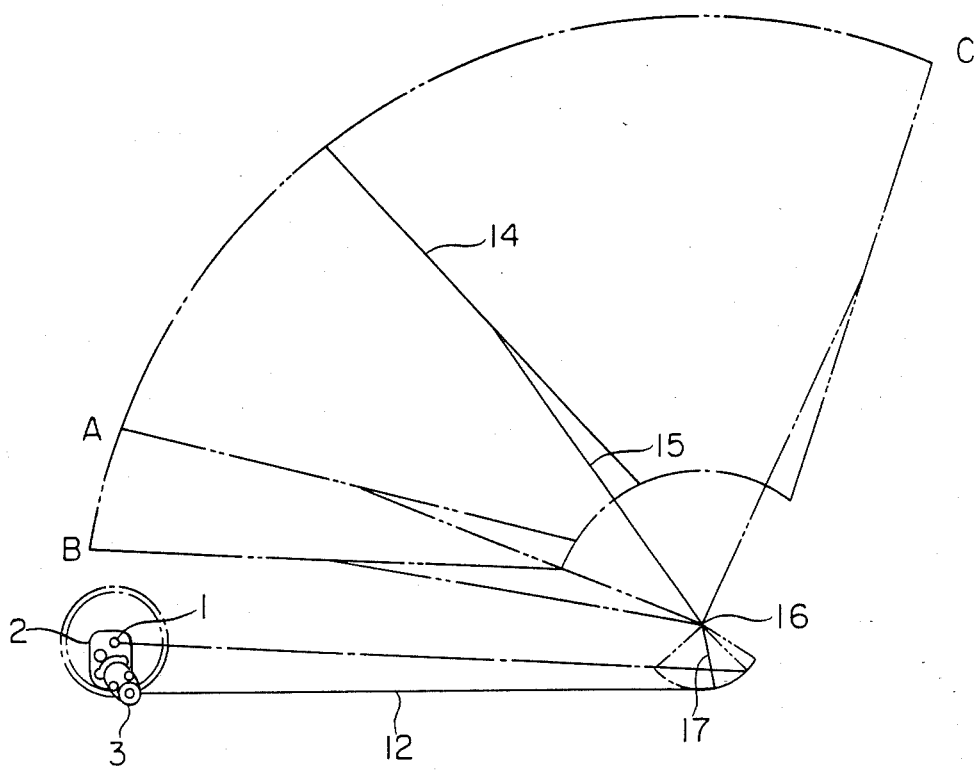
Figure 14B:
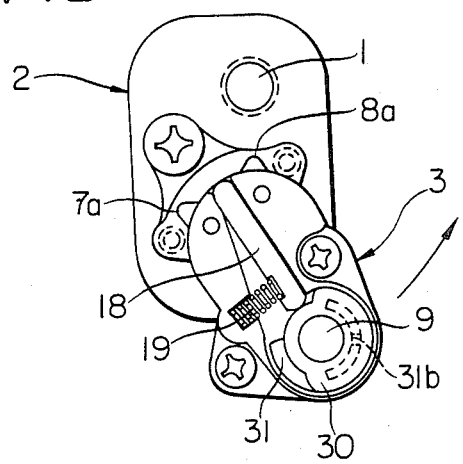
Figure 15A:
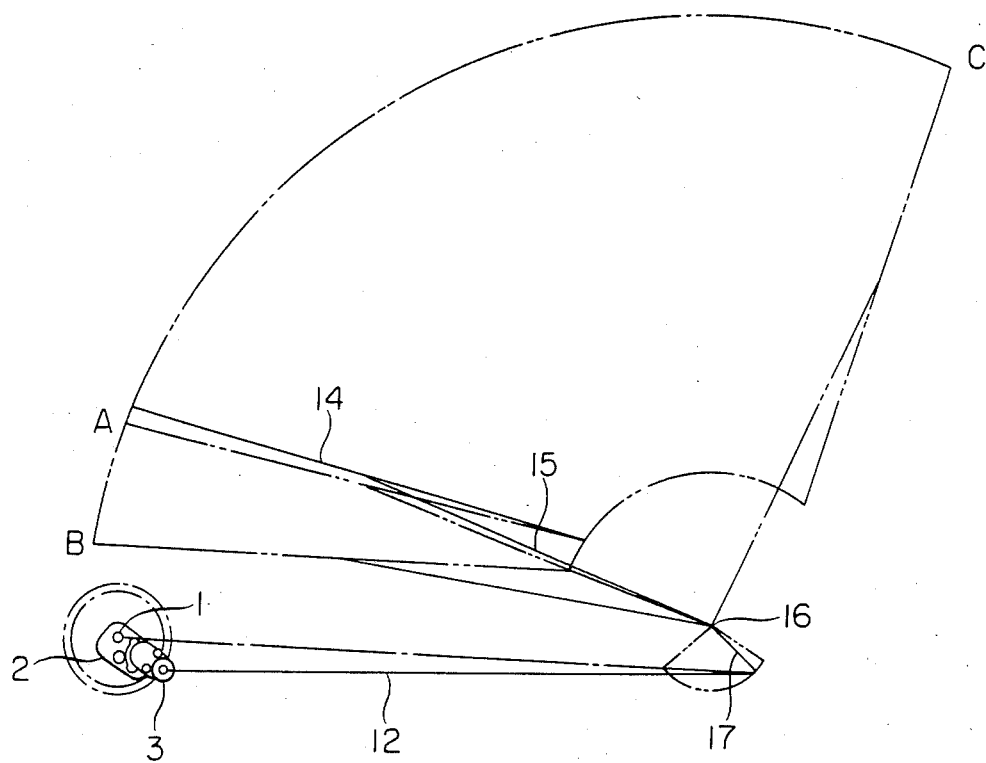
Figure 15B:
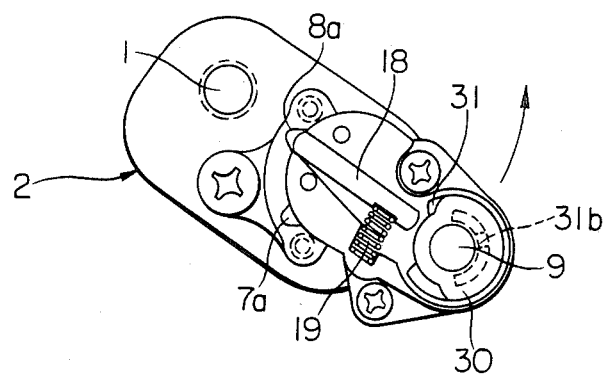

The detent 18 is dislodged from the recess as shown in FIGS. 13A, 13A and 14A, 14B and urged into the recess a while the first and second cranks 2, 3 are straightened in longitudinal alignment. The reverse rotation of the first and second cranks in longitudinal alignment continues until the wiper blade 14 reaches the extreme end A of the normal wiping movement, as shown in FIGS. 15A, 15B.

Figure 16A:
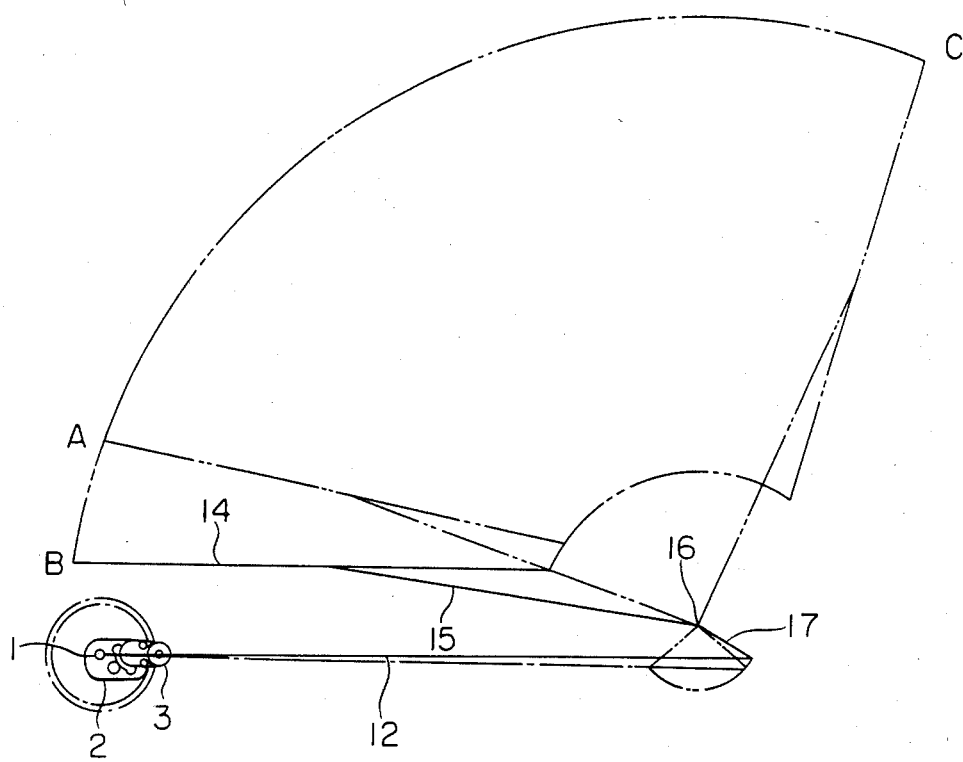
Figure 16B:
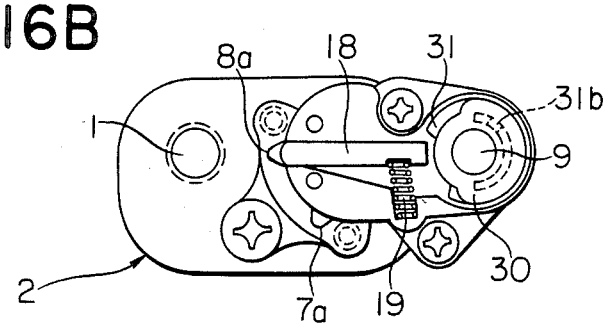

FIGS. 16A and 16B illustrate the first and second cranks 2, 3 in their straightened position continuing to rotate until the wiper blade 14 has been moved from the extreme end A of the wiping movement to the retracted position B. Upon the blade 14 reaching the retracted position, the automatic stopping-at-fixed position mechanism is actuated to stop the wiper motor. When the wiper blade 14 is thus moved to the retracted position B by the reverse rotation of the output shaft 1, the notches 30a and 31a of the cam members 30 and 31, respectively are aligned with each other, and the aligned notches 30a, 31a are in an position opposing the detent 18 to release the locking action on the detent.

It is thus to be understood that the cam means for locking the detent which serves to join the first and second cranks 2, 3 comprises two cam members and that the two cam members are arranged to cooperate during the wiping operation to maintain said detent in its locked position irrespective of the angular position of the cam members, whereby it is assured that no play or creaking occurs in the crank mechanism during the wiping operation.

Figure 17A:
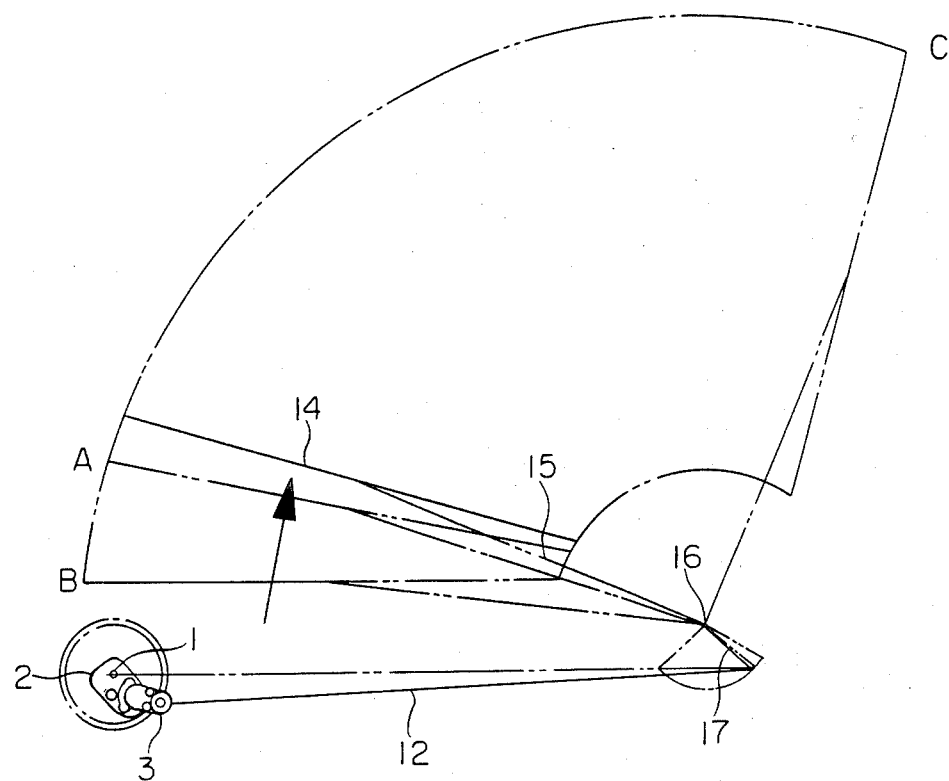
FIGS. 17A and 17B are diagrammatic views illustrating the operative condition of the wiper apparatus when the wiper blade is subjected to external forces tending to force the wiper blade upwardly during the process in which the wiper blade is moved from its retracted position up to its normal operational rotation.
Figure 17B:
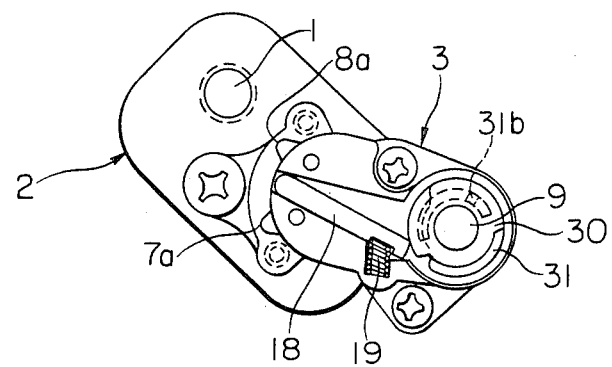

When the detent 18 is dislodged from the recess 8a and extended toward the cam members 30, 31 during the process in which the wiper blade 14 is moved from its retracted position B to the state of normal oscillatory operation by the forward rotation of the motor (FIGS. 7A, 7B-9A, 9B), that is, during the process in which the first crank 2 and second crank 3 are moved from their straightened position to their bent position, if external forces such as strong wind due to high speed driving of the automobile should be exerted on the wiper blade to force it upward in its direction of rotation, the upper cam member 30 associated with the links 12, 17 would be accelerated in its forward direction of rotation, with the result that the peripheral surfaces of the cam members abut against the adjacent end of the detent with the recess 7a. When such situation occurs, with the construction according to this invention, the shoulder of the rotating cam member 30 abuts with the adjacent end of the detent 18 to displace the detent into the relieved area 36 against the biasing force of the spring 19, so that the arcuate raised cam surface of the cam member 30 comes into smooth sliding contact with the end of the detent as shown in FIG. 17B whereby heavy collision or biting contact between the cam and detent which might cause chipping or destruction of the cam and/or the detent is prevented. The second crank 3 continues to be bent relative to the first crank in this condition until the detent 18 is brought into alignment with the recess 7a, whereupon the detent 18 is urged into the recess 7a by the spring 19 and locked therein by the cam members 30, 31 to hold the first and second cranks at their bent position as shown in Fig. 11B. Thus, with the construction according to this invention, destruction of the cam members and/or the detent which would be caused by collision or biting is prevented, and any interference with smooth transiting of the cranks from their straight extended position to their bent position is avoided.

Figure 18:
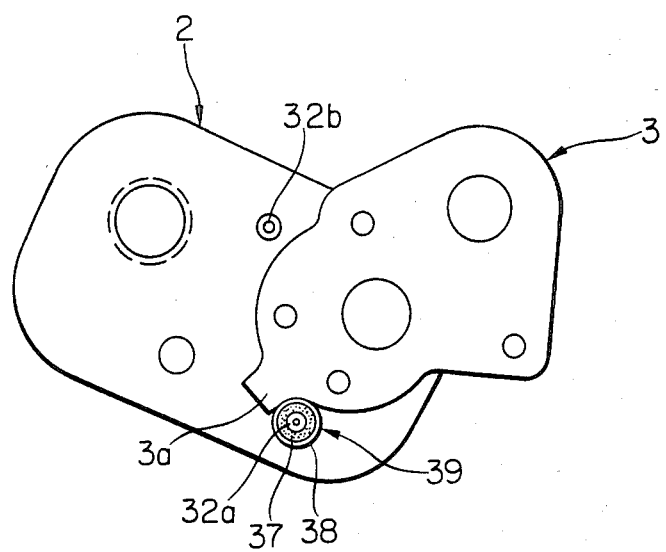
FIG. 18 is a diagrammatic view illustrating the operation of shock absorbing means according to this invention during the normal operation of the wiper apparatus.

Furthermore, during the normal operation of the wiper apparatus, the second crank 3 is kept bent at an angle relative to the first crank 2 with the extension 3a of the second crank in abutment with the pin 32a upstanding from the first crank as shown in FIG. 18. It is to be understood that any shock due to vibrations transmitted from the wiper blade is buffered and absorbed by the shock absorbing means 39 fitted over the pin 32a.

What is claimed is:

1. A retractable type wiper apparatus comprising a first crank (2) connected to an output shaft (1) of a reducer of a wiper motor; a second crank (3) rotatably secured to the first crank by means of a first pivot shaft (5) and so arranged that the second crank is kept bent at a predetermined angle relative to the first crank during the rotation of the first crank in the forward direction, and kept extended substantially straight relative to the first crank during the rotation of the first crank in the reverse direction; stop means (7, 8) provided on the first crank for defining a first locking recess (7a) and second locking recess (8a); a detent (18) longitudinally slidably mounted on the second crank; a spring means (19) urging said detent selectively into said first and second locking recesses to thereby lock the second crank in place when the second crank is positioned at the predetermined angled position and at the straight extended position, respectively relative to the first crank; means (36) for allowing the detent to be tilted in the direction of forward rotation of the second crank about an end of said detent adjacent said stop means; link means (12, 17) rotatably connected to the second crank by means of a second pivot shaft (9) for transmitting the motion of the second crank to a wiper blade (14); and cam means rotatably mounted over the second pivot shaft and adapted to press and lock said detent as it is urged into either said first or second recess, said cam means comprising two superposed cam members (30, 31) both engageable with said detent, one of the cam members being connected integrally with said link means and the other of the cam members being adapted to be moved together with the one cam member with a limited range of lost motion so that the two cam members are maintained at such angles relative to each other that they cooperate to press and lock said detent during the rotation of said first crank in the forward direction.

2. The wiper apparatus of claim 1 wherein said spring is disposed obliquely transversely to the longitudinal axis of said detent to exert components of force on the detent to urge the latter toward said stop means as well as toward the direction of rotation opposite to that of the forward rotation of said second crank about said end of the detent.

3. The wiper apparatus of claim 2 wherein a guide frame (20) is secured to said second crank, said guide frame having a guide channel (35) for guiding the longitudinal sliding movement of said detent, said channel having opposed longitudinal side walls, said means (36) for allowing the detent to be tilted comprising one of said opposed side walls which extends angularly from adjacenet said end of the detent so as to define a sector-shaped relieved area (36) for accommodating said tilting of the detent, said spring normally urging said detent against the other of said side walls of the channel and toward said stop means.

4. The wiper apparatus of claim 1 wherein said stop means comprises a generally arcuate member (33) secured to said first crank, said arcuate member defining an arcuate surface with which said end of the detent is slidably engageable, said arcuate surface terminating adjacent its opposite ends in said first and second locking recesses (7a, 8a).

5. A retractable type wiper apparatus comprising a first crank (2) connected to an output shaft (1) of a reducer of a wiper motor; a second crank (3) rotatably secured to the first crank by means of a first pivot shaft (5) and so arranged that the second crank is kept bent at a predetermined angle relative to the first crank during the rotation of the first crank in the forward direction, and kept extended substantially straight relative to the first crank during the rotation of the first crank in the reverse direction; stop means (7, 8) provided on the first crank for defining a first locking recess (7a) and second locking recess (8a); a detent (18) longitudinally slidably mounted on the second crank; a spring means (19) urging said detent selectively into said first and second locking recesses to thereby lock the second crank in place when the second crank is positioned at the predetermined angled position and at the straight extended position, respectively relative to the first crank; link means (12, 17) rotatably connected to the second crank by means of a second pivot shaft (9) for transmitting the motion of the second crank to a wiper blade (14); shock absorbing means (37, 38) for buffering vibrations transmitted from the wiper blade to the second crank during the rotation of the first crank in the forward direction; and cam means rotatably mounted over the second pivot shaft and adapted to press and lock said detent as it is urged into either said first or second recess, said cam means comprising two superposed cam members (30, 31) both engageable with said detent, one of the cam members being connected integrally with said link means and the other of the cam members being adapted to be moved together with the one cam member with a limited range of lost motion so that the two cam members are maintained at such angles relative to each other that they cooperate to press and lock said detent during the rotation of said first crank in the forward direction.

6. The wiper apparatus of claim 5 further comprising a pair of spaced stop pins (32a, 32b) upstanding from said first crank adjacent said first and second locking recesses, and wherein said second crank has an extension (3a) projecting therefrom, said extension being adapted to abut against said stop pins to limit the range of angular movement of the second crank, said shock absorbing means comprising a resilient ring (37) fitted over one of said stop pins and a sleeve (38) surrounding said ring, said sleeve being adapted to be engaged by said extension.

* * * * *